United States Patent
Kim et al.

(10) Patent No.: US 12,511,725 B2
(45) Date of Patent: Dec. 30, 2025

(54) IMAGE PROCESSING APPARATUS, IMAGE PROCESSING METHOD AND COMPUTER-READABLE STORAGE MEDIUM FOR DIRECT MEMORY ACCESSES

(71) Applicant: Samsung Electronics Co., Ltd., Suwon-si (KR)

(72) Inventors: Seungwan Kim, Suwon-si (KR); Deoksoo Park, Suwon-si (KR); Byoungju Song, Suwon-si (KR); Sanghoon Lee, Suwon-si (KR); Yongkwon Cho, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 200 days.

(21) Appl. No.: 18/469,017

(22) Filed: Sep. 18, 2023

(65) Prior Publication Data
US 2024/0119573 A1    Apr. 11, 2024

(30) Foreign Application Priority Data
Sep. 30, 2022  (KR) ........................ 10-2022-0125774

(51) Int. Cl.
*G06T 5/92*    (2024.01)
*G06T 5/40*    (2006.01)

(52) U.S. Cl.
CPC . *G06T 5/92* (2024.01); *G06T 5/40* (2013.01)

(58) Field of Classification Search
CPC .... G06T 5/92; G06T 5/94; G06T 5/40; G06T 2207/20004; G06T 2207/20008; G06T 2207/20012
See application file for complete search history.

(56) References Cited

U.S. PATENT DOCUMENTS

| | | | |
|---|---|---|---|
| 8,295,596 B1 | 10/2012 | Srinivasan et al. | |
| 8,781,225 B2 * | 7/2014 | Hsu | G06T 5/94 382/167 |
| 8,866,928 B2 * | 10/2014 | Geiss | H04N 23/71 348/222.1 |
| 9,922,616 B2 | 3/2018 | Yang et al. | |
| 10,129,511 B2 * | 11/2018 | Nose | G06T 5/92 |
| 10,467,737 B2 * | 11/2019 | Navarrete Michelini | G06T 5/92 |

(Continued)

FOREIGN PATENT DOCUMENTS

| | | | | | |
|---|---|---|---|---|---|
| JP | 2021071955 A | * | 5/2021 | ............... | G06T 5/40 |
| KR | 101515444 B1 | * | 4/2015 | ............. | H04N 9/646 |

(Continued)

*Primary Examiner* — John Villecco
(74) *Attorney, Agent, or Firm* — Harness, Dickey & Pierce, P.L.C.

(57) ABSTRACT

An image processing method includes transforming input image data into a histogram, equalizing the histogram using a cumulative distribution function, setting a first weight value based on the equalized histogram and a first reference value, generating a first tone curve based on the equalized histogram and the first weight value, generating a final output tone curve by applying a second weight value to the first tone curve and an output of a second tone curve applied to the input image data, and generating output image data based on the final output tone curve and the input image data.

20 Claims, 11 Drawing Sheets

(56) References Cited

U.S. PATENT DOCUMENTS

| | | | |
|---|---|---|---|
| 10,607,325 B2* | 3/2020 | Li | G06T 5/40 |
| 11,120,532 B2* | 9/2021 | Li | G06T 5/40 |
| 11,354,788 B1* | 6/2022 | Chen | G09G 5/026 |
| 11,455,708 B2* | 9/2022 | Kim | G06T 5/92 |
| 2007/0268534 A1* | 11/2007 | Duan | G06T 5/40 |
| | | | 358/520 |
| 2010/0278423 A1* | 11/2010 | Itoh | G06T 5/40 |
| | | | 382/274 |
| 2018/0035088 A1* | 2/2018 | Nose | H04N 9/3182 |
| 2020/0219238 A1* | 7/2020 | Peng | H04N 9/68 |
| 2022/0164930 A1* | 5/2022 | Kim | G06T 5/92 |
| 2022/0180486 A1* | 6/2022 | Chen | G06T 5/94 |
| 2024/0054623 A1* | 2/2024 | Chen | H04N 13/271 |
| 2025/0148957 A1* | 5/2025 | Kim | G06T 5/00 |

FOREIGN PATENT DOCUMENTS

| | | | | |
|---|---|---|---|---|
| KR | 102244918 B1 | 4/2021 | | |
| WO | WO-2021189222 A1 * | 9/2021 | | G06T 5/92 |
| WO | WO-2024169641 A1 * | 8/2024 | | H04N 9/643 |

\* cited by examiner

IMAGE PROCESSING APPARATUS, IMAGE PROCESSING METHOD AND COMPUTER-READABLE STORAGE MEDIUM FOR DIRECT MEMORY ACCESSES

CROSS-REFERENCE TO RELATED APPLICATION

This U.S. non-provisional application is based on and claims the benefit of priority under 35 U.S.C. § 119 to Korean Patent Application No. 10-2022-0125774, filed on Sep. 30, 2022, in the Korean Intellectual Property Office, the disclosure of which is incorporated by reference herein in its entirety.

BACKGROUND

Various example embodiments of the inventive concepts relate to an image processing apparatus, an image processing system, an image processing method, and/or a non-transitory computer-readable storage medium, etc. More specifically, one or more of the example embodiments of the inventive concepts relate to an image processing method, a non-transitory computer-readable storage medium, an image processing system, and/or an image processing apparatus in which a result of analyzing an image with a histogram is applied to a tone curve, etc.

Recently, user demand for image capture devices, such as digital cameras, digital camcorders, camera phones, etc., has increased rapidly. Accordingly, the image capture devices are more sophisticated and have more diverse functions.

A luminance range of a display device is less than a luminance range that may be perceived by the human eye. Accordingly, in order to display data having a wide dynamic range, an appropriate conversion technique for the data is desired for display devices. One of the common conversion techniques is tone mapping.

Tone mapping is a technique used in image processing and computer graphics which maps one set of colors to another using a medium with a limited dynamic range to approximate the appearances of high dynamic range images.

Conventional tone mapping includes global tone mapping which performs tone mapping by using only one tone mapping operator for the entire image, and local tone mapping which performs tone mapping on each pixel included in the image according to a pixel value of a corresponding pixel and pixel values of peripheral pixels.

However, conventional global tone mapping techniques may cause an image quality problem on an image having certain characteristics depending on input images, and conventional local tone mapping techniques may cause a shadow effect in a region with a large difference in brightness in an image configuration.

SUMMARY

Various example embodiments of the inventive concepts improve outdoor visibility in a display of an image processing apparatus.

According to at least one example embodiment of the inventive concepts, an image processing method is provided.

The image processing method includes transforming input image data into a histogram, equalizing the histogram using a cumulative distribution function, setting a first weight value based on the equalized histogram and a first reference value, generating a first tone curve based on the equalized histogram and the first weight value, generating a final output tone curve by applying a second weight value to the first tone curve and an output of a second tone curve applied to the input image data, and generating output image data based on the final output tone curve and the input image data.

According to at least one example embodiment of the inventive concepts, an image processing apparatus is provided.

The image processing apparatus includes at least one processor configured to, receive image data, perform global tone mapping on the received image data, perform local tone mapping on the global tone mapped image data, perform histogram tone mapping on the local tone mapped image data, and generate a tone-mapped first output by performing a weighted sum of outputs of the performed global tone mapping and the performed local tone mapping, generate a histogram tone curve output by performing a weighted sum of the tone-mapped first output and an output of the performed histogram tone mapping, generate a final output tone curve based on the tone-mapped first output and the histogram tone curve output, and generate output image data based on the final output tone curve and the received image data.

According to at least one example embodiment of the inventive concepts, a non-transitory computer-readable medium is provided.

The non-transitory computer-readable medium includes including computer readable instructions, which when executed by at least one processor, causes the at least one processor to transform an input image data into a histogram, equalize the histogram using a cumulative distribution function, set a first weight value based on the equalized histogram and a first reference value, generate a first tone curve of the histogram by using the first weight value, generate a final output tone curve by applying a second weight value to the first tone curve and a second tone curve applied to the input image data, and generate output image data based on the final output tone curve and the input image data.

BRIEF DESCRIPTION OF THE DRAWINGS

Various example embodiments will be more clearly understood from the following detailed description taken in conjunction with the accompanying drawings in which.

DETAILED DESCRIPTION

Hereinafter, various example embodiments of the inventive concepts will be described with reference to the accompanying drawings.

Figure 1:
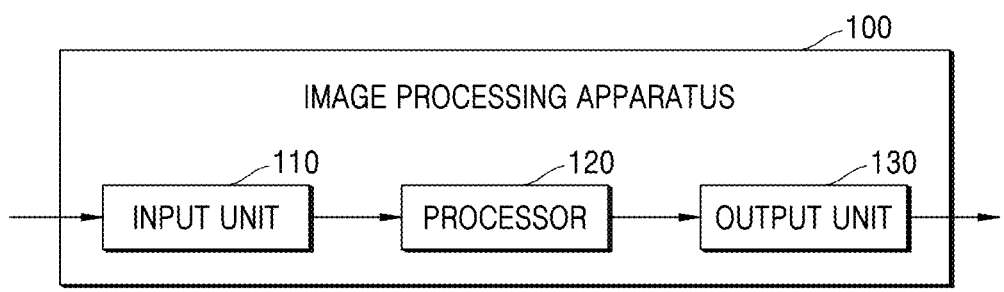
FIG. 1 is a block diagram of an image processing apparatus according to at least one example embodiment of the inventive concepts.

FIG. 1 is a block diagram of an image processing apparatus according to at least one example embodiment of the inventive concepts.

An image processing apparatus 100 may include an input unit 110, at least one processor 120, and/or an output unit 130, etc., but the example embodiments are not limited thereto, and for example, the image processing apparatus 100 may include a greater or lesser number of constituent components. The image processing apparatus 100 according to at least one example embodiment of the inventive concepts may be an electronic device having an image and/or light sensing function. For example, the image processing apparatus 100 may be any one of a camera, a smartphone, a tablet, a wearable device, an Internet of Things (IoT) device, a personal computer (PC), a laptop, a personal digital assistant (PDA), a gaming console, and/or a portable multimedia player (PMP), etc. For example, the image processing apparatus 100 may further be provided as a component in vehicles, drones, home appliances, furniture, manufacturing facilities, doors, sensors, and/or various measurement devices, etc.

The input unit 110 (e.g., input circuitry, an input device, etc.) may receive at least one image to be displayed. Input image data may include a plurality of pixel values. The input unit 110 according to at least one example embodiment may store, e.g., in a buffer, etc., input pixel values of pixels included in an image frame to be displayed and/or currently displayed, etc. Input image data according to at least one example embodiment may include at least one of coordinates and/or the number of vertices comprising at least one object of an image, texture data, properties, and/or geometric information, etc., in addition to the input pixel values, but the example embodiments are not limited thereto. Hereinafter, images and image data may be used interchangeably.

The processor 120 may adjust at least one of luminance, resolution, and/or precision values of all or part of at least one image to be displayed. The processor 120 according to at least one example embodiment may be an application specific integrated circuit (ASIC), an embedded processor, a microprocessor, hardware control logic, a hardware finite state machine (FSM), a digital signal processor (DSP), or a combination thereof, but is not limited thereto.

A region (e.g., image region, pixel region, etc.) of which luminance, resolution, and/or precision values are adjusted may be a certain spatial region of an image or a set of pixels that satisfy a desired and/or preset condition. The processor 120 according to at least one example embodiment may adjust only one of the luminance, the resolution, and the precision values, but is not limited thereto. The processor 120 according to at least one example embodiment may adjust at least two of the luminance, the resolution, and the precision values, etc., but is not limited thereto. When the processor 120 adjusts at least two of the luminance, the resolution, and the precision values, the region to be adjusted may be independently determined. For example, the processor 120 may adjust luminance values of pixels having an input pixel value with luminance values greater than or equal to a desired and/or preset reference value, select a spatial region in an image separate from the adjusted pixels, and adjust the resolution values of the selected region, etc.

The processor 120 according to at least one example embodiment may adjust (e.g., reduce, increase, etc.) the luminance of an image to be displayed. The processor 120 according to at least one example embodiment may adjust a tone curve representing a correlation between an input pixel value and an output pixel value and may obtain, calculate, and/or generate an output pixel value corresponding to an input pixel value for at least one pixel among a plurality of pixels included in image data based on the adjusted tone curve. The obtained output pixel value may have a different value from the input pixel value corresponding to the output pixel value, but is not limited thereto. Adjusting a tone curve according to at least one example embodiment may include transforming an initial ton curve (e.g., a pre-stored tone curve, etc.) and determining the transformed tone curve as at least one tone curve for obtaining an output pixel value. Adjusting the tone curve according to at least one example embodiment may include generating a new tone curve when there is no initial and/or pre-stored tone curve and determining the generated new tone curve as at least one tone curve for obtaining an output pixel value, etc.

The processor 120 according to at least one example embodiment may provide the image processing apparatus 100 with improved outdoor visibility by adjusting a tone curve associated with an image, etc. The processor 120 according to at least one example embodiment may further adjust a tone curve by using histogram data to relax the tone curve, but the example embodiments are not limited thereto.

The output unit 130 (e.g., output circuitry, output device, etc.) may output image data including the obtained output pixel values. Image data including the output pixel values according to at least one example embodiment may be stored in memory, e.g., a buffer, etc., and the image data stored in the memory (e.g., buffer, etc.) may be displayed on at least one screen of the image processing apparatus 100 and/or on at least one screen of an external device, etc.

According to at least one example embodiment, the image processing apparatus 100 is illustrated as including the input unit 110, the processor 120, and/or the output unit 130, etc., but is not limited thereto, and for example, the image processing apparatus 100 may include only the processor 120. For example, the processor 120 of the image processing apparatus 100 may receive data for image processing, adjust at least one of luminance, resolution, and precision values for a low power mode with respect to the input image data according to at least one example embodiment, and output the adjusted image data, etc., but the example embodiments are not limited thereto.

Figure 2:
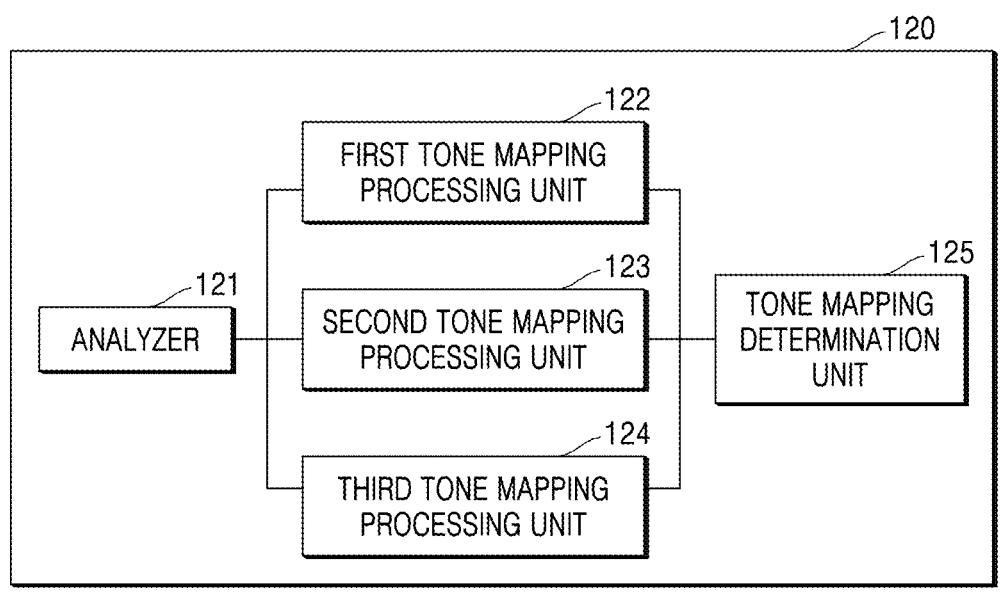
FIG. 2 is a block diagram of a processor according to at least one example embodiment of the inventive concepts.

FIG. 2 is a block diagram of a processor according to at least one example embodiment of the inventive concepts.

The processor 120 according to at least one example embodiment of the inventive concepts may include an analyzer 121 (e.g., analyzer sub-circuit, etc.), a plurality of tone mapping processing units (e.g., tone mapping processing sub-circuits, etc.), e.g., a first tone mapping processing unit 122, a second tone mapping processing unit 123, and/or a third tone mapping processing unit 124, etc., and/or a tone mapping determination unit 125 (e.g., tone mapping determination sub-circuits, etc.), etc., but the example embodiments are not limited thereto, and for example, the processor 120 may include a greater or lesser number of constituent elements. The analyzer 121 may analyze image data transmitted from the input unit 110 in FIG. 1, but is not limited thereto. The analyzer 121 may analyze the image data transmitted from the input unit and generate parameter values for determining a plurality of tone mappings, e.g., a first tone mapping, a second tone mapping, and/or a third tone mapping, etc., but the example embodiments are not limited thereto, and for example, there may be a greater or lesser number of tone mappings. According to at least one example embodiment, the analyzer 121 may generate a plurality of parameter values for determining the plurality of tone mappings, e.g., the first tone mapping, the second tone mapping, and/or the third tone mapping according to and/or based on a statistical analysis (for example, histogram analysis, etc.) of input display data and/or an ambient brightness signal, etc.

The first tone mapping processing unit 122, the second tone mapping processing unit 123, and/or the third tone mapping processing unit 124 may determine tone curves in different ways. For example, the first tone mapping processing unit 122 may perform global tone mapping, but is not limited thereto. The first tone mapping processing unit 122 may determine a global tone curve for performing the global tone mapping, or in other words, a single, spatially uniform, tone curve is applied to every pixel in an image regardless of pixel values of surrounding pixels in the image. Additionally, the second tone mapping processing unit 123 may perform local tone mapping, but is not limited thereto. The second tone mapping processing unit 123 may determine a local tone curve for performing the local tone mapping, or in other words, one or more spatially varying tone curves may be applied to a desired pixel in an image based on the pixel values of pixels surrounding the desired pixel. The third tone mapping processing unit 124 may perform histogram tone mapping, but is not limited thereto. The third tone mapping processing unit 124 may determine a histogram tone curve, e.g., a histogram which displays the tonal distribution of pixel values of the image, for performing the histogram tone mapping. The first tone mapping processing unit 122, the second tone mapping processing unit 123, and/or the third tone mapping processing unit 124 may independently determine a tone curve, but the example embodiments are not limited thereto.

The tone mapping determination unit 125 may perform a weighted sum of outputs of the first tone mapping processing unit 122, the second tone mapping processing unit 123, and the output of the third tone mapping processing unit 124 to determine a final output tone curve, but the example embodiments are not limited thereto. A detailed operation method of the tone mapping determination unit 125 is described below with reference to FIG. 3.

Figure 3:
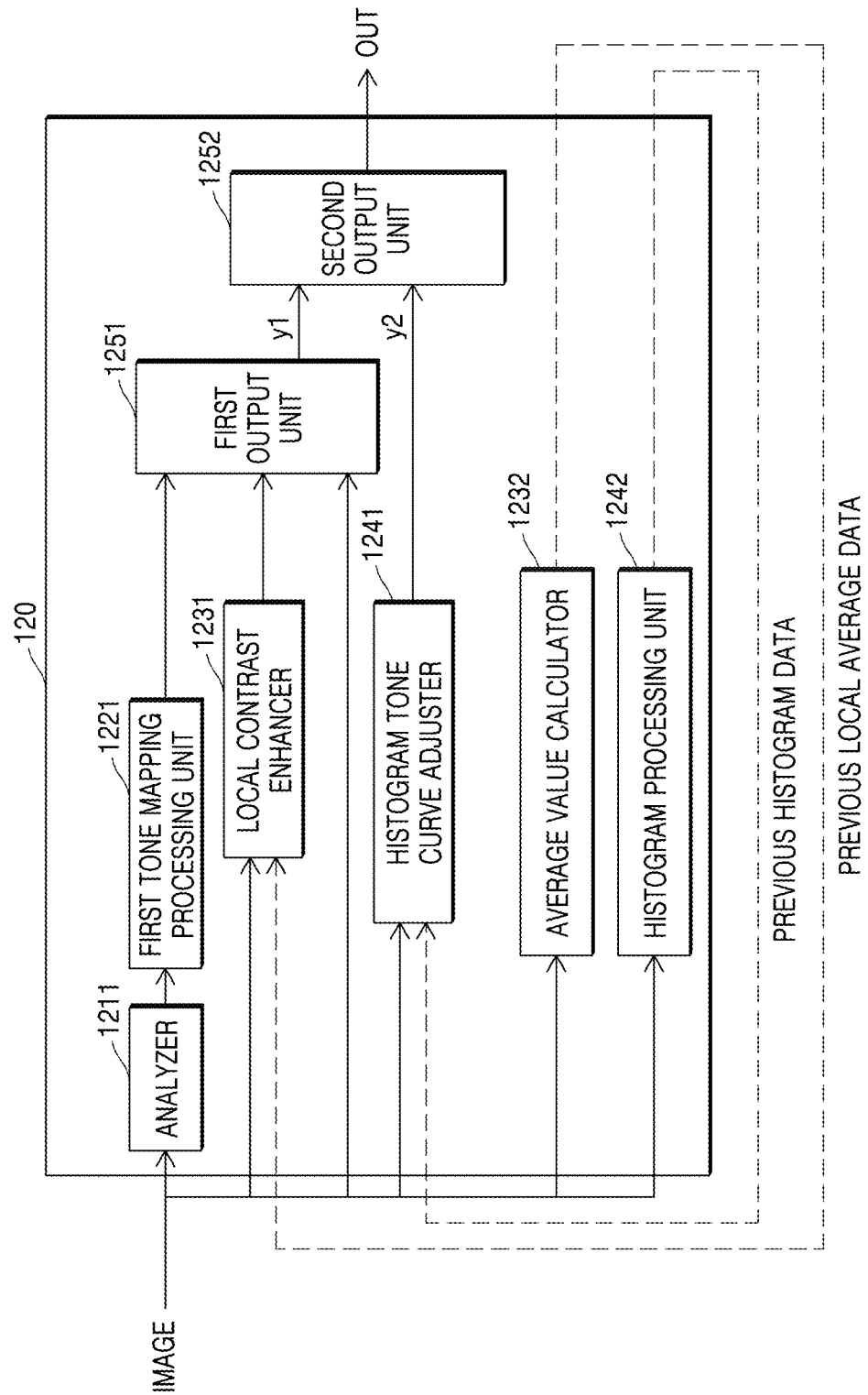
FIG. 3 is a block diagram of a processor according to at least one example embodiment of the inventive concepts.

FIG. 3 is a block diagram of a processor according to at least one example embodiment of the inventive concepts.

Referring to FIG. 3, a more detailed block diagram of components included in the block diagram of FIG. 2 is illustrated, but the example embodiments are not limited thereto. For example, the configuration of the processor illustrated in FIG. 2 is not limited to the configuration illustrated in FIG. 3.

Referring to FIG. 3, an analyzer 1211 may analyze at least one input image. For example, the analyzer 1211 may analyze outdoor visibility by considering and/or based on the input image and/or outdoor light intensity, etc. The analyzer 1211 may determine how much tone mapping is to be performed after analyzing outdoor visibility. After analyzing outdoor visibility, the analyzer 1211 may determine how much first tone mapping, second tone mapping, and/or third tone mapping, etc., are to be performed. A condition for determining how much tone mapping the analyzer 1211 performs is not limited to outdoor visibility, and other conditions may also be additionally considered, such as low light visibility, nighttime visibility, indoor visibility, high action/motion visibility, etc.

Referring to FIG. 3, a first tone mapping processing unit 1221 may adjust a global tone curve, but is not limited thereto. The first tone mapping processing unit 1221 may perform global tone mapping in which tone mapping is performed by using only one tone mapping operator for all of the pixels of the entire image. Second tone mapping processing units 1231 and 1232 may perform tone mapping of each of the plurality of pixels included in an image according to and/or based on a pixel value of a respective pixel and pixel values of peripheral pixels (e.g., pixels peripheral to the respective pixel, etc.). The plurality of second tone mapping processing units 1231 and 1232, etc., may include an average value calculator 1232 and/or a local contrast enhancer 1231, etc., but are not limited thereto. The average value calculator 1232 may divide image data by zone and obtain, generate, and/or calculate an average value for each zone. The local contrast enhancer 1231 may perform tone mapping on each zone by using an average value calculated by the average value calculator 1232, etc.

A plurality of third tone mapping processing units 1241 and 1242, etc., may include a histogram processing unit 1242 and/or a histogram tone curve adjuster 1241, etc., but is not limited thereto. The histogram processing unit 1242 may analyze a histogram of image data (e.g., analyze the pixel values of the image to generate a histogram corresponding to the image, etc.), and equalize the histogram equalization. The histogram tone curve adjuster 1241 may determine a first weight value by comparing a size of a histogram bin obtained as a result of processing by the histogram processing unit 1242 with a first reference value and/or a second reference value, and adjust a histogram tone curve by using the first weight value. The histogram processing unit 1242 may obtain a histogram of an image input in a current frame (e.g., a current image frame) and transfer, use, and/or apply the histogram to the next frame (e.g., the subsequent image frame), but the example embodiments are not limited thereto. The first weight value, first reference value, and the second reference value will be discussed in greater detail in connection with FIG. 8. Referring to FIG. 3, the histogram processing unit 1242 may receive image data in real time, but is not limited thereto. The image data received in real time may be input to image frames in a sequence of the image frames. The histogram processing unit 1242 may obtain a histogram of the first image frame and transfer the histogram of the first image frame to the second image frame, etc. When processing the second image frame, the histogram processing may be performed through a histogram processing result of the first image frame, etc.

The histogram processing unit 1242 may extract a luminance histogram from the input image and calculate a cumulative distribution function (CDF) for the extracted luminance histogram. For example, the histogram processing unit 1242 may count pixel frequencies for each luminance level of the input image and generate a luminance histogram based on the count results, but is not limited thereto. The CDF may be a histogram pixel transformation function, but is not limited thereto. The histogram processing unit 1242 may generate an equalization curve by normalizing the calculated CDF, but is not limited thereto.

When the number of pixels having a k value is h[k], a histogram equalized curve HE[k] output from the histogram processing unit 1242 may be calculated as follows.

$$CDF[k] = \sum_{i=0}^{k} h[i]$$

$$HE[k] = \frac{N}{W \times H} \times CDF[k]$$

N: maximum value of input range

W: width of input image

H: height of input image

The equation described above shows a histogram equalization (HE) calculation process in which histogram-processed data is calculated and normalized by using a CDF, but the example embodiments are not limited thereto.

According to at least one example embodiment, the histogram processing unit 1242 may generate at least one histogram tone curve based on a luminance distribution (e.g., distribution of the luminance values of pixels included in the input image, etc.) of the input image data. The histogram processing unit 1242 may generate a luminance distribution histogram based on the luminance distribution in the entire region (e.g., all of the pixels included in the input image) of the input image data and may generate a histogram tone curve based on the generated luminance distribution histogram. The histogram tone curve may equalize the luminance distribution histogram, but the example embodiments are not limited thereto.

The histogram tone curve adjuster 1241 may calculate difference values between adjacent histogram bins among a plurality of histogram bins processed by the histogram processing unit 1242, and may compare the greatest difference value among the difference values with a first reference value, but is not limited thereto. The histogram tone curve adjuster 1241 may adjust a first weight value to the greatest weight value when the greatest difference value is less than or equal to the first reference value. The histogram tone curve adjuster 1241 may adjust the first weight value to a value greater than a target weight value when the greatest difference value is greater than the first reference value and less than or equal to the second reference value, and may adjust the first weight value to the target weight value when the greatest difference value is greater than the second reference value. In this case, the first reference value may be obtained by subtracting a transient length from a desired and/or preset threshold. The second reference value may be a desired and/or preset threshold (e.g., may be a user-configured value and/or a system-configured value, etc.). When the transient length is a value greater than 0, the first reference value may be less than the second reference value. When the transient length is 0, the first reference value may be equal to the second reference value. The desired and/or preset threshold may be a value less than the greatest difference value. According to some example embodiments, the transient length may be set to an arbitrary value by a user, the system, etc., and for example, may be set based on experiential data. A method of determining the first weight value by the histogram tone curve adjuster 1241 is described below in detail with reference to FIG. 8.

The histogram tone curve adjuster 1241 may adjust a histogram processed by the histogram processing unit 1242 and a histogram tone curve obtained by applying the first weight value to a straight line having a slope of 1, but the example embodiments are not limited thereto. An equation thereof may be represented as follows.

$$\text{AdjustedCurve[idx]} =$$

$$(\text{HistEqualizedCurve[idx]} \times \text{weight} + \text{idx} \times (256 = \text{weight})) \gg 8$$

In the equation described above, "weight" refers to a first weight value. "AdjustedCurve[idx]" refers to an adjusted histogram tone curve which appears as a result of determining a weighted sum using idx. "HistEqualizedCurve[idx]" refers to a histogram tone curve obtained as a result of equalization. "idx" refers to a tone curve serving as a reference point for relaxing the tone curve. According to at least one example embodiment, idx refers to a graph in the form of y=x, but the example embodiments are not limited thereto. When the first weight value has the greatest value, the processor 120 may not adjust the histogram tone curve (e.g., may omit adjusting the histogram tone curve) because the weight value due to idx is 0 in the equation described above. According to the equation described above, a histogram tone curve configured dramatically may be relaxed by performing a weighted sum of the histogram processing result obtained by the histogram processing unit 1242 and a graph of, e.g., y=x, by applying the first weight value to the histogram processing result, but the example embodiments are not limited thereto.

Tone mapping determination units 1251 and 1252 may determine a final output tone curve by applying the second weight value to the histogram tone curve (obtained by applying the first weight value to the histogram processing result) and the output tone curve (obtained by the first tone mapping processing unit 1221 and the second tone mapping processing unit 1231 and 1232). The tone mapping determination units 1251 and 1252 may include a first output unit 1251 and a second output unit 1252, but are not limited thereto. The first output unit 1251 may receive weight values and tone-mapped images and/or videos as inputs from the first tone mapping processing unit 1221 and the local contrast enhancer 1231, but is not limited thereto. The first output unit 1251 may generate a tone-mapped first output y1 by mixing outputs of the first tone mapping processing unit 1221 and the local contrast enhancer 1231. The second output unit 1252 may receive the first output y1 and a histogram tone curve output y2 from the histogram tone curve adjuster 1241, but is not limited thereto. An output from the second output unit 1252 may be represented as follows, but is not limited thereto.

$$\text{FinalOutput} = (\text{DRC} \times \alpha + \text{AdjustedCurve} \times (1-\alpha)) \, 0 \leq \alpha \leq 1$$

"FinalOutput" refers to a final tone curve output. Dynamic range control (DRC) refers to the first output y1. "AdjustedCurve" refers to the second output y2. "α" refers to a second weight value. The second weight value may be determined by a user, may be set by the system, etc. The second weight value may have a range of 0 to 1. For example, the second weight value may be adjusted to a small value when emphasizing the contrast of an image, etc. The second weight value may be adjusted to a large value when emphasizing the existing output, etc. A small value or a large value of the second weight value may indicate a small value or a large value based on an average value of the second weight value, but the example embodiments are not limited thereto.

Figure 4:
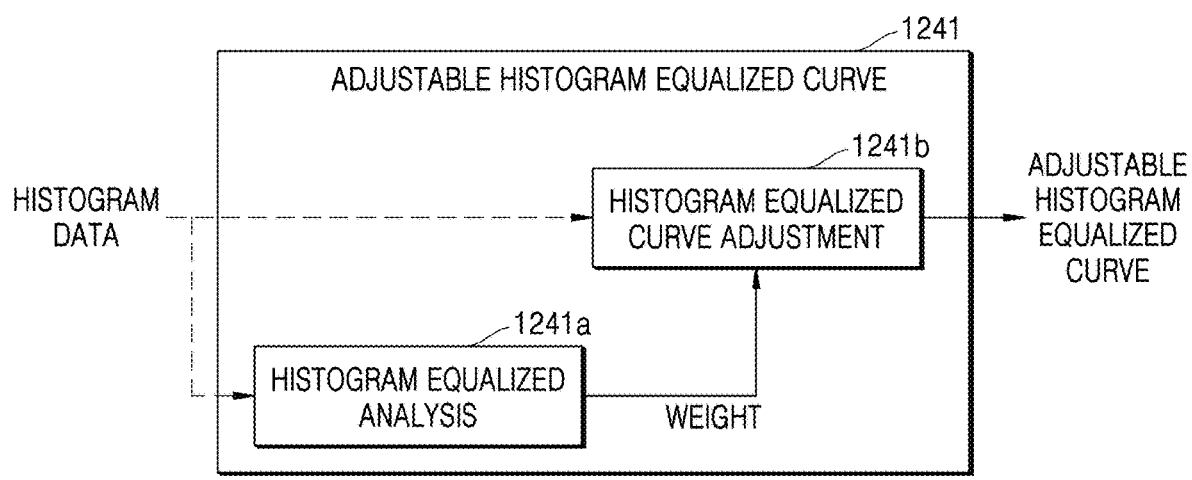
FIG. 4 is a block diagram of a histogram tone curve adjuster according to at least one example embodiment of the inventive concepts.

FIG. 4 is a block diagram of a histogram tone curve adjuster according to at least one example embodiment of the inventive concepts.

Referring to FIG. 4, the histogram tone curve adjuster 1241 may include a histogram equalization analyzer 1241a and/or a histogram equalization curve adjuster 1241b, etc., but the example embodiments are not limited thereto, and for example, the histogram tone curve adjuster 1241 may include a greater or lesser number of constituent elements, etc.

Referring to FIG. 4, histogram data output from the histogram processing unit 1242 may be applied to the histogram equalization analyzer 1241a and/or the histogram equalization curve adjuster 1241b, etc. Histogram data illustrated in FIG. 4 may indicate data represented in the form of a histogram bin. The histogram equalization analyzer 1241a may determine a size of the greatest histogram bin from the histogram data and determine a first weight value by comparing the determined size with a first reference value and/or a second reference value, but is not limited thereto. The histogram equalization curve adjuster 1241b may adjust and/or relax a tone curve of the histogram data through the first weight value obtained by the histogram equalization analyzer 1241a. Depending on a value of the first weight value, a tone curve of the histogram data may be relaxed, or the tone curve of the histogram data may not need to be relaxed.

That is, the histogram equalization analyzer 1241a may determine the first weight value through a result of comparing the size of the greatest histogram bin with the first reference value and/or the second reference value, etc., and may determine whether to relax the histogram tone curve by using the determined first weight value.

Figure 5:
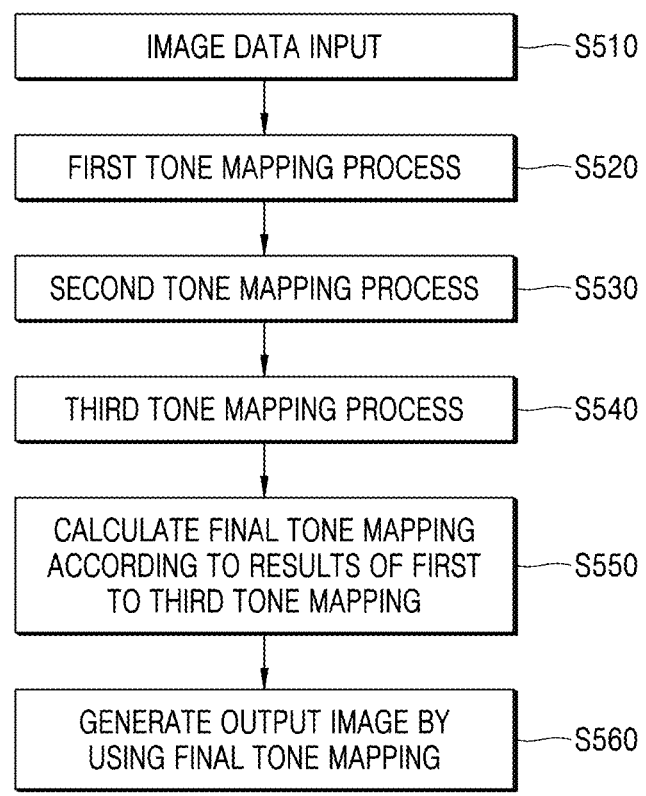
FIG. 5 is a flowchart of an image processing method according to at least one example embodiment of the inventive concepts.

FIG. 5 is a flowchart of an image processing method according to at least one example embodiment of the inventive concepts.

Referring to FIG. 5, image data, e.g., at least one image frame, may be input into and/or received by the processor 120 in operation S510. Image data may include pixel data, but is not limited thereto, and for example, may include metadata, etc. The processor 120 may perform a first tone mapping process on the input image data in operation S520. The first tone mapping process may be a global tone mapping process, but is not limited thereto. The processor 120 may perform a second tone mapping process on the input image data, and/or the result of the first tone mapping process, in operation S530. The second tone mapping process may be a local tone mapping process, but the example embodiments are not limited thereto. The processor 120 may perform a third tone mapping process on the input image data, and/or the result of the second tone mapping process, in operation S540. The third tone mapping process may be a histogram tone mapping process, but the example embodiments are not limited thereto. A histogram tone mapping processing method according to some example embodiments is described below with reference to FIGS. 6A and 6B.

Referring again to the flowchart of FIG. 5, the first tone mapping process, the second tone mapping process, and/or the third tone mapping process may be sequentially performed, but the example embodiments are not limited thereto, and the sequence in which the first tone mapping process, the second tone mapping process, and/or the third tone mapping process are performed is not limited to the flowchart illustrated in FIG. 5, and in some example embodiments, the tone mapping processes may be performed in different orders. In addition, referring to the flowchart of FIG. 5, the first tone mapping process, the second tone mapping process, and/or the third tone mapping process are sequentially connected such that a result of the first tone mapping process is input to the second tone mapping process and the result of the second tone mapping process is input to the third tone mapping process, etc., but this is for the sake of convenience of description, and the first tone mapping process, the second tone mapping process, and/or the third tone mapping process may be processed independently of each other, in parallel to each other, etc.

Referring back to FIG. 5, the processor 120 may determine a final tone mapping according to and/or based on results of the first to third tone mapping processes in operation S550, but the example embodiments are not limited thereto. In operation S550, the final tone mapping may be determined by blending the results of the first to third tone mapping processes, but is not limited thereto. In operation S550, the processor 120 may obtain, calculate, and/or generate a weighted sum of the first output and a second output, the first output generated by blending the results of the first tone mapping process and second tone mapping process, and the second output generated based on a tone curve according to and/or based on the result of the third tone mapping and adding a second weight value thereto.

In operation S560, the processor 120 may generate an output image using the final tone mapping, and the output image may be displayed by the processor 120, another processor (e.g., a graphics processor, etc.), an external device, etc.

Figure 6A:
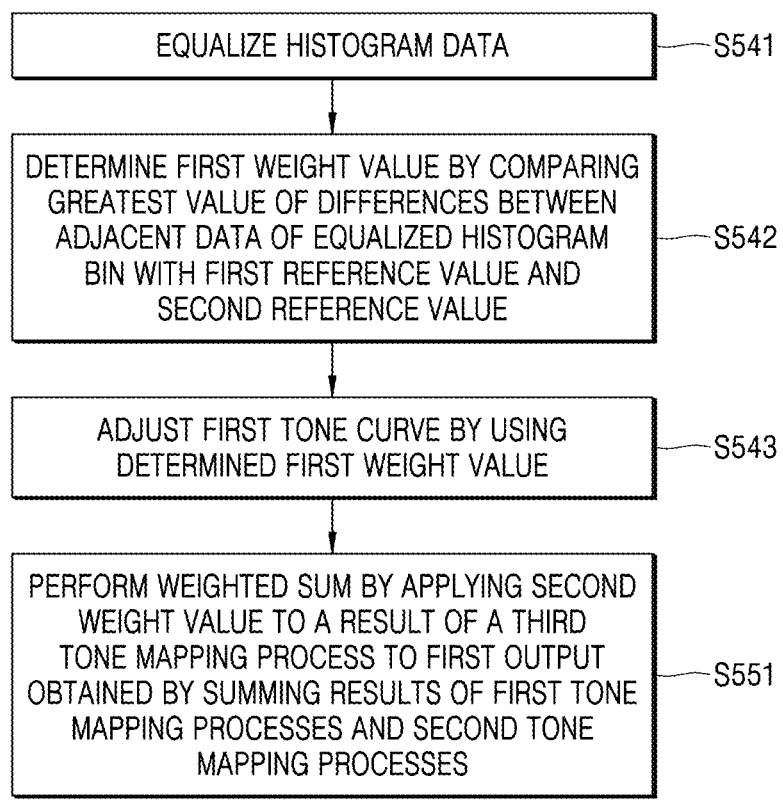
FIGS. 6A and 6B are flowcharts of an image processing method according to at least one example embodiment of the inventive concepts.
Figure 6B:
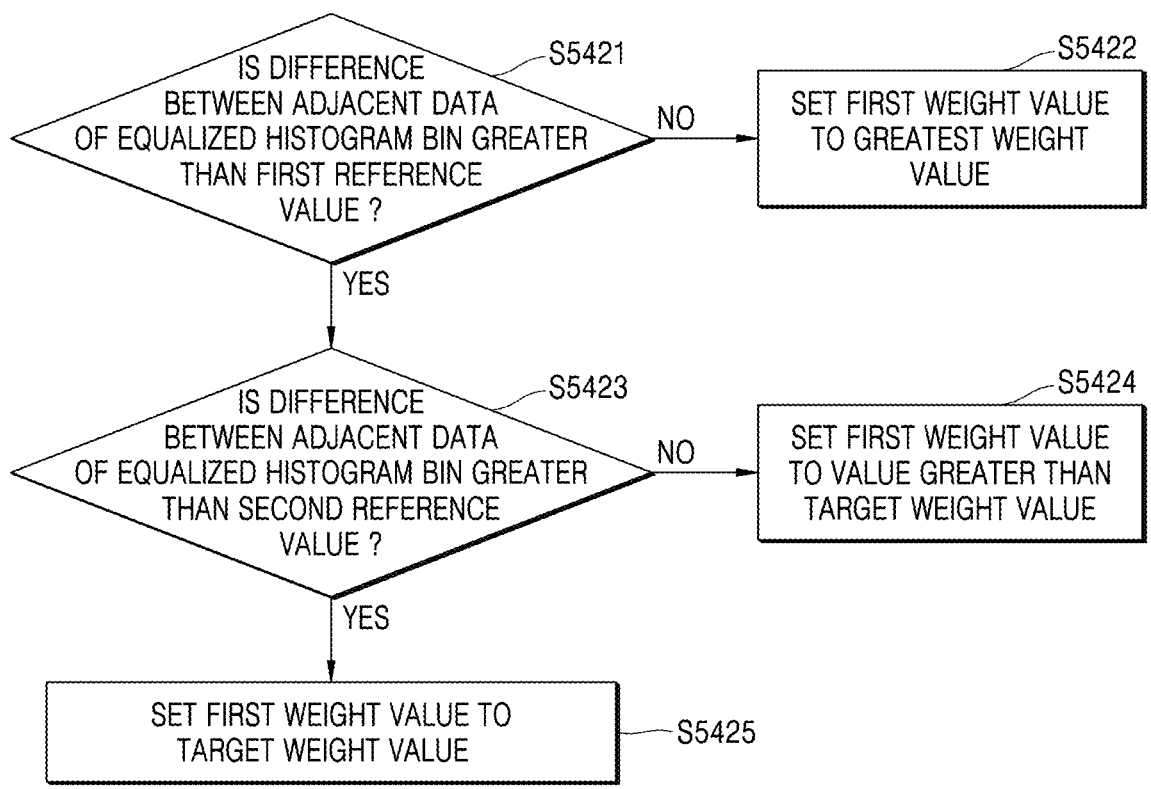

FIGS. 6A and 6B are flowcharts of an image processing method according to at least one example embodiment of the inventive concepts.

FIG. 6A is a flowchart illustrating a method of performing the third tone mapping process and deriving a final output by using a tone curve obtained by performing the third tone mapping process.

Operation S541, operation S542, and operation S543 of FIG. 6A may be included in operation S540 of FIG. 5, but the example embodiments are not limited thereto. Operation S551 of FIG. 6A may be included in operation S550 of FIG. 5, but the example embodiments are not limited thereto.

In operation S541, the processor 120 may equalize histogram data. Equalization of the histogram data may be performed by using a CDF, but is not limited thereto. For example, a histogram equalization algorithm may be used to equalize a luminance distribution histogram, and the histogram equalization algorithm may be an algorithm which maps luminance values of an input image such that a distribution of the luminance values is even in all sections of the input image. In at least one example embodiment, the equalized histogram shows a linear cumulative histogram, but is not limited thereto.

In operation S542, the processor 120 may determine a first weight value by comparing the greatest value (and/or highest value, etc.) of differences between adjacent data of the equalized histogram bin with a first reference value and/or a second reference value, etc.

In operation S543, the processor 120 may adjust a first tone curve using the determined first weight value. The first tone curve may indicate a histogram tone curve.

In operation S551, the processor 120 may obtain, calculate, and/or generate a weighted sum of a first output by summing results of the first tone mapping process and the second tone mapping process. Additionally, the processor 120 may obtain, calculate, and/or generate a result of the third tone mapping process by applying a second weight value to the result (e.g., the calculated weighted sum of the first output, etc.).

FIG. 6B is a flowchart illustrating a method of determining the first weight value when the third tone mapping process is performed.

Operation S5421 to operation S5425 of FIG. 6B may be included in operation S542 of FIG. 6A, but the example embodiments are not limited thereto.

In operation S5421, the processor 120 may determine whether a difference between adjacent data of the equalized histogram bin is greater than a first reference value (e.g., a first desired value), etc.

Figure 8:
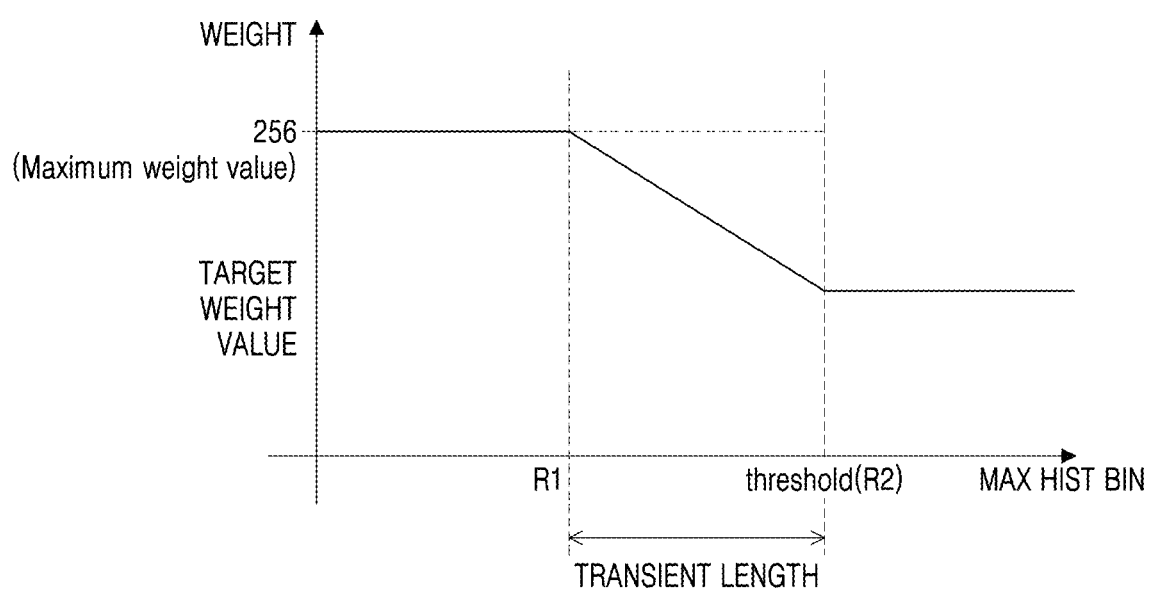
FIG. 8 is a graph illustrating a method of determining a first weight value by using a third tone mapping processing unit, according to at least one example embodiment of the inventive concepts.

When the difference between adjacent data of the equalized histogram bin is less than or equal to the first reference value, the processor 120 may set the first weight value to the greatest weight value in operation S5422. In this case, the greatest weight value may change depending on how many bits are included in the pixels of the image data, but the example embodiments are not limited thereto. As illustrated in FIG. 8 to be discussed below, a weight value of an 8-bit pixel may be set to a value between the weight value range of 0 and 256, but the example embodiments are not limited thereto. When the first weight value is set to the greatest weight value (e.g., 256 in the event of an 8-bit pixel), the processor 120 may not perform (e.g., omit, etc.) relaxation of a histogram tone curve.

When the difference between adjacent data of the equalized histogram bin is greater than the first reference value, the processor 120 may determine in operation S5423 whether the difference between the adjacent data of the equalized histogram bin is greater than the second reference value. When the difference between adjacent data of the equalized histogram bin is greater than the first reference value and less than or equal to the second reference value, the processor 120 may set the first weight value to a value greater than a target weight value in operation S5424. When the difference between adjacent data of the equalized histogram bin is greater than the second reference value, the processor 120 may set the first weight value to the target weight value in operation S5425.

That is, the processor 120 may set the first weight value by comparing the difference between adjacent data of the equalized histogram bin with the first reference value and/or the second reference value, etc. A detailed equation for this will be further described with reference to FIG. 8.

In operation S5421 and operation S5423, the processor 120 may obtain, calculate, and/or generate difference values from all histogram bins, and the greatest value may be derived by comparing all derived difference values through a process of obtaining the difference between the first and second reference values and the adjacent data of the equalized histogram bin. The derived greatest value may become a target for comparison of the first reference value and the second reference value.

A sequence of the operations illustrated in FIGS. 5 to 6B is only at least one example embodiment, and the example embodiments of the inventive concepts are not limited thereto. That is, in at least one example embodiment, a sequence of some of the operations illustrated in FIGS. 5 to 6B may also be exchanged with each other to be performed. In addition, in at least one example embodiment, some or all of the operations illustrated in FIGS. 5 to 6B may also be performed in parallel. In addition, only some of the operations illustrated in FIGS. 5 to 6B may be performed (e.g., some operations may be omitted).

FIGS. 5 to 6B illustrate only one cycle of at least one example embodiment of a tone mapping method, and the tone mapping method illustrated in FIGS. 5 to 6B may be repeatedly performed. According to at least one example embodiment operation S510 of receiving image data may be performed again after operation S560 of generating an output image by using final tone mapping is performed.

In addition, one or more of the example embodiments of the inventive concepts include a non-transitory recording medium in which the methods described above are implemented as computer-readable code and recorded therein. A non-transitory computer-readable recording medium includes all types of recording devices in which data that may be read by a computer system is stored. For example, a non-transitory computer-readable recording medium includes read only memory (ROM), random access memory (RAM), a compact disk ROM (CD-ROM), magnetic tape, a floppy disk, an optical data storage device, or so on. In addition, the non-transitory computer-readable recording medium may store and implement computer-readable code received from and/or distributed over a networked computer system to be read in a distributed manner.

Figure 7:
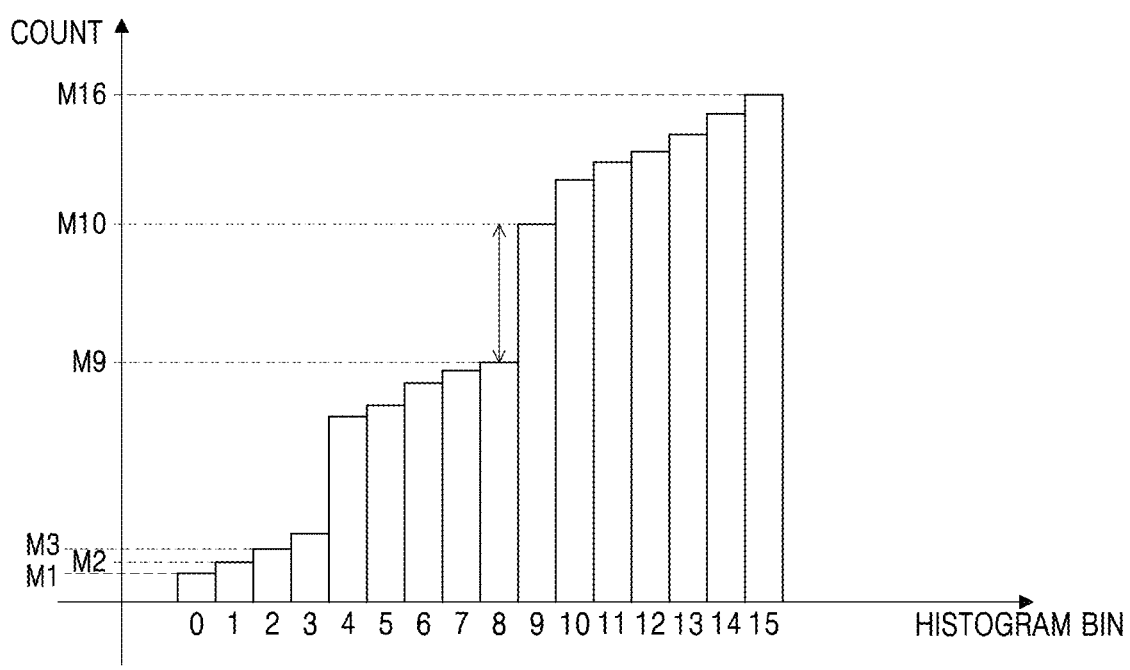
FIG. 7 is a histogram illustrating a processing method of a third tone mapping processing unit, according to at least one example embodiment of the inventive concepts.

FIG. 7 is a histogram illustrating a processing method of a third tone mapping processing unit, according to at least one example embodiment of the inventive concepts.

FIG. 7 may be a histogram obtained as a result of processing by the histogram processing unit 1242 of FIG. 3, but the example embodiments are not limited thereto. Referring to FIG. 7, first to sixteenth histogram bins 0 to 15 are illustrated, but the example embodiments are not limited thereto, and there may be a greater or lesser number of histogram bins processed by the histogram processing unit 1242, etc. 8-bit pixel information may be included in the first to sixteenth histogram bins, but is not limited thereto. The number of histogram bins may be adjusted. According to at least one example embodiment, the horizontal axis of the graph of FIG. 7 may include up to 256 histogram bins in the case of 8 bits, but the example embodiments are not limited thereto, and for example, a greater or lesser number of bits may be used for the pixel information of an image. However, a range of 0 to 255 that may be represented on the horizontal axis corresponds to 8 bits of an image, and a range of grayscale values that may be displayed on the horizontal axis changes depending on the number of bits of the input image. For example, when the input image has 10 bits, the grayscale values may range from a minimum of 0 to a maximum of 1023, etc.

The first to sixteenth histogram bins 0 to 15 of FIG. 7 may be a graph representing cumulative histogram bins, but the example embodiments are not limited thereto. Accordingly, the sixteenth histogram bin 15 may be a histogram bin including pixel information of 8 bits, but is not limited thereto. In the description of FIG. 7, the vertical size of the histogram bin may represent a pixel value included in a corresponding histogram bin.

A size (e.g., vertical size, height, etc.) of the first histogram bin 0 may be M1. A size of the second histogram bin 1 may be M2-M1 which is a difference between the second histogram bin 1 and the first histogram bin 0, etc. A size of the third histogram bin 2 may be M3-M2 which is a difference between the third histogram bin 2 and the second histogram bin 1, etc. As described above, a size of the n-th histogram bin may be the same as a difference between the n-th histogram bin and the n−1-th histogram bin. In this case, n may be 16 in FIG. 7, but the example embodiments are not limited thereto.

In this way, a size of each histogram bin may be obtained by obtaining the deviation of each of the first to sixteenth histogram bins from an equalization view of a cumulative histogram illustrated in FIG. 7. A decision regarding whether to relax the histogram tone curve may be determined by comparing a size of the histogram bin having the greatest size among the first to sixteenth histogram bins 0 to 15 with reference to and/or in comparison to the first reference value and the second reference value, etc. This will be further described with reference to FIG. 8.

FIG. 8 is a graph illustrating a method of determining a first weight value by using the third tone mapping processing unit, according to at least one example embodiment of the inventive concepts.

The horizontal axis of the graph of FIG. 8 represents the greatest size (e.g., highest value, etc.) of a histogram bin. The vertical axis of the graph in FIG. 8 represents the first weight value. The greatest weight value that the first weight value may have may be 256 assuming an 8-bit image, but the example embodiments are not limited thereto.

Referring to the graph of FIG. 8, a plurality of reference values, such as a first reference value R1 and a second reference value R2 may be set and/or adjusted, but the example embodiments are not limited thereto, and for example, there may be greater than or less than two reference values, etc. The first reference value R1 may indicate a value obtained by subtracting a transient length from the second reference value R2. The second reference value R2 may indicate a desired and/or preset threshold. The transient length may change depending on a size of a target weight value and a desired and/or preset threshold, wherein the target weight value and/or the desired and/or preset threshold may be user-configurable and/or system-configurable values, etc. For example, the target weight value and/or the desired and/or preset threshold may be determined heuristically according to and/or based on certain rules (e.g., desired rules) of human vision and/or may be empirically set by polling a user preference's regarding perspective images while changing backlight illumination, etc., but the example embodiments are not limited thereto.

Referring to the graph of FIG. 8, when the greatest size of a histogram bin is less than the first reference value R1, the first weight value may be set to the greatest weight value, but the example embodiments are not limited thereto. When the greatest size of the histogram bin is greater than the first reference value R1 and is less than the second reference value R2, the first weight value may be adjusted to a desired value between a target weight value and the greatest weight value. When the greatest size of the histogram bin is greater than the second reference value R2, the first weight value may be set to the target weight value, etc.

Referring to the graph of FIG. 8, the first weight value may change depending on results of comparing the greatest size of the histogram bin with the first reference value R1 and the second reference value R2.

This will be clarified by a more detailed equation below.

$$x = (\text{Target weight} - 256) \times \frac{\max \ hist \ bin - (\text{threshold} - \text{transient length})}{\text{transient length}}$$

In the equation described above, "max hist bin" is a value of the greatest histogram bin, "threshold" refers to the second reference value R2, and "transient length" refers to a length (e.g., distance, difference, etc.) between the first reference value R1 and the second reference value R2.

Figure 9:
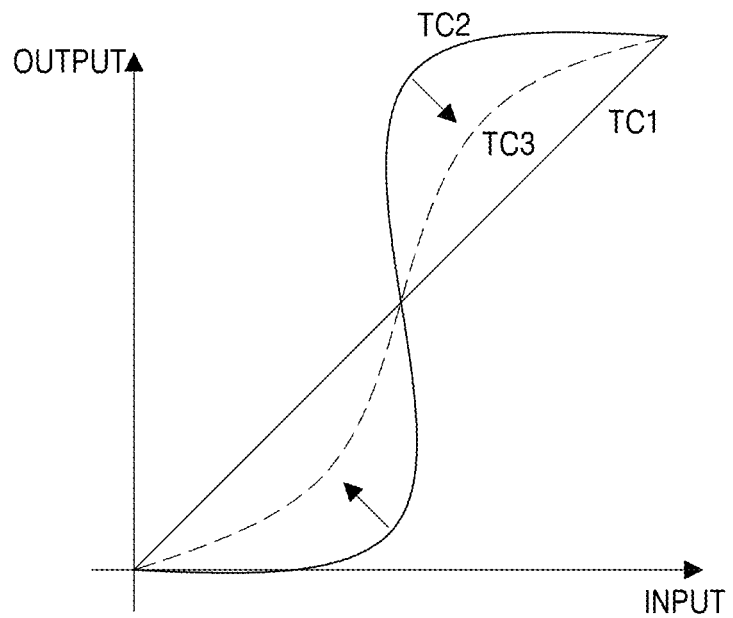
FIG. 9 is a graph illustrating that a tone curve is adjusted by the third tone mapping processing unit as a first weight value is applied thereto, according to at least one example embodiment of the inventive concepts.

FIG. 9 is a graph illustrating that a tone curve is adjusted by the third tone mapping processing unit as a first weight value is applied thereto, according to at least one example embodiment of the inventive concepts.

According to at least one example embodiment, the image processing apparatus may have at least one tone mapping setting for transforming a first grayscale value of an input image into a second grayscale value of an output image. The setting may be represented in the form of curves and/or straight lines on the tone mapping graph.

According to at least one example embodiment, the graph of FIG. 9 illustrates a tone curve of the image processing apparatus before and after the histogram tone curve is adjusted and illustrates a correlation between an input grayscale (shown on the X axis) and an output grayscale (shown on the Y axis) of the image processing apparatus. That is, the X axis represents all grayscale values that an input image of the image processing apparatus may have, and the Y axis represents grayscale values that an output image of the image formation apparatus, e.g., a printed image, an image displayed on a display screen, etc., may have, with respect to the grayscale values of the input image, wherein the image formation apparatus has a lower color range and/or lower dynamic range than the image processing apparatus, etc.

An ideal tone curve TC1 in FIG. 9 represents a straight line. That is, the ideal tone curve TC1 has linearity that has a constant slope, e.g., Y=X, and accordingly, an input image may be printed, displayed, and/or output without color distortion and/or color modification. In addition, a tone curve TC2 before the histogram tone curve is adjusted in FIG. 9 has a curve rather than a straight line, and particularly, wherein the slope of the curve near a middle grayscale or a high grayscale is gentle (e.g., has a low slope), and accordingly, when two colors having a grayscale difference therebetween near the middle grayscale or the high grayscale are printed, displayed and/or output, it is difficult to distinguish the two colors because the grayscale difference between the two printed colors is reduced. In order to increase a grayscale difference between two colors, the tone curve may be adjusted by using the first weight value by the histogram tone curve adjuster, and as a result, a tone curve TC3 may be obtained after a histogram tone curve is adjusted. Through this, the tone curve may be closer to a linear graph, e.g., Y=X, than the original output image, and accordingly, a more stable tone curve may be obtained and/or an improved image quality may be obtained.

Figure 10:
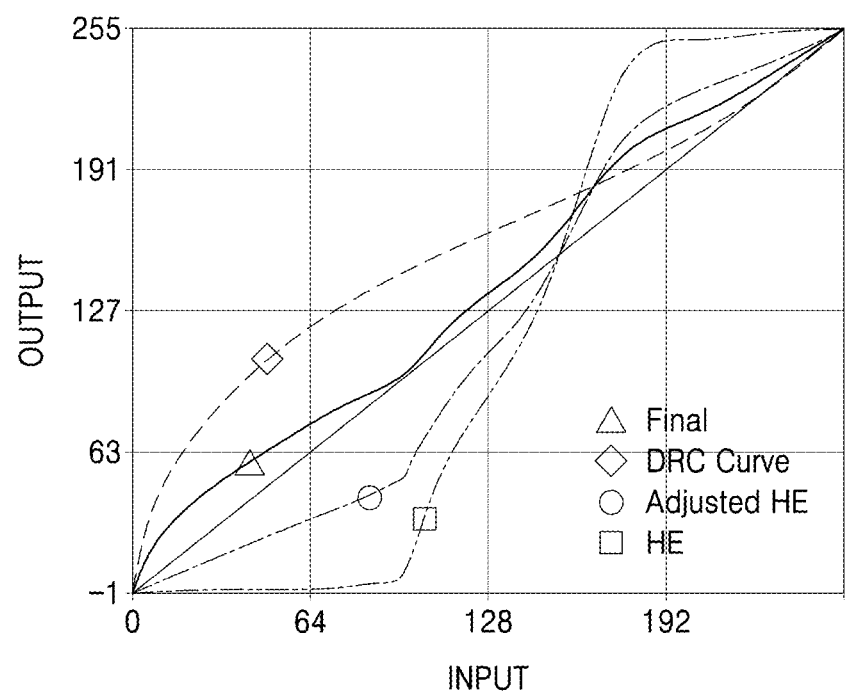
FIG. 10 is a graph illustrating a processing method of a tone mapping determination unit, according to at least one example embodiment of the inventive concepts.

FIG. 10 is a graph illustrating a processing method of a tone mapping determination unit, according to at least one example embodiment of the inventive concepts.

FIG. 10 illustrates a final tone curve Final, a tone curve DRC Curve due to the first output, a tone curve HE by histogram equalization, and a histogram tone curve Adjusted HE adjusted through the first weight value, but the example embodiments are not limited thereto.

Referring to FIG. 10, it can be seen that the tone curve HE due to and/or corresponding to histogram equalization dramatically changes in slope in one or more sections of the curve, resulting in difficulties distinguishing colors of the image. As a result of performing a weighted sum of a linear line (e.g., constant slope), e.g., y=x, by using the first weight value, the histogram tone curve Adjusted HE adjusted through the first weight value is obtained. It can be seen that a slope of the histogram tone curve Adjusted HE adjusted through the first weight value is gentler (e.g., has a smaller slope) than a slope of the tone curve HE by histogram equalization.

FIG. 10 illustrates the final tone curve Final obtained by performing a weighted sum of the histogram tone curve Adjusted HE adjusted through the first weight value by using the tone curve DRC Curve by the first output and the second weight value. It can be seen that the final tone curve Final has an output shape having a slope which is closer to having a constant slope, e.g., more similar to y=x, etc., than the previous histogram tone curves, which facilitates and/or provides for easy color distinguishment in the processed image. Through this, a tone curve may be flexibly adjusted in and/or prepared for various external environments and/or different display device types, etc., and a dynamic range may be adjusted in a wider range, and thus, improved and/or good image quality may be obtained.

While various example embodiments of the inventive concepts have been particularly shown and described herein, it will be understood that various changes in form and details may be made therein without departing from the spirit and scope of the following claims.

What is claimed is:

1. An image processing method comprising:
   transforming input image data into a histogram;
   equalizing the histogram using a cumulative distribution function;
   setting a first weight value based on the equalized histogram and a first reference value;
   generating a first tone curve based on the equalized histogram and the first weight value;
   generating a final output tone curve by applying a second weight value to the first tone curve and an output of a second tone curve applied to the input image data; and
   generating output image data based on the final output tone curve and the input image data.

2. The image processing method of claim 1, wherein the setting the first weight value further comprises:
   calculating a plurality of difference values between adjacent histogram bins among a plurality of histogram bins included in the equalized histogram; and
   comparing a greatest difference value among the plurality of difference values with the first reference value.

3. The image processing method of claim 2, wherein the setting the first weight value further comprises:
   setting the first weight value to a greatest weight value of a first weight value range in response to the greatest difference value being less than or equal to the first reference value.

4. The image processing method of claim 2, further comprising:
   setting the first weight value to a value greater than a target weight value in response to the greatest difference value being greater than the first reference value and less than or equal to a second reference value; and
   setting the first weight value to the target weight value in response to the greatest difference value being greater than the second reference value.

5. The image processing method of claim 4, wherein the first reference value is obtained by subtracting a transient length from a desired threshold value, and the second reference value is set to the desired threshold value.

6. The image processing method of claim 1, wherein the generating the first tone curve further includes:
   generating a histogram tone curve from the input image data and the equalized histogram; and
   generating the first tone curve through a weighted sum obtained by applying the first weight value to a linear line having a slope of 1 and the histogram tone curve.

7. The image processing method of claim 1, further comprising:
   generating the second tone curve by performing global tone mapping and local tone mapping on the input image data.

8. An image processing apparatus comprising:
   at least one processor configured to,
   receive image data,
   perform global tone mapping on the received image data,
   perform local tone mapping on the global tone mapped image data,
   perform histogram tone mapping on the local tone mapped image data,
   generate a tone-mapped first output by performing a weighted sum of outputs of the performed global tone mapping and the performed local tone mapping,
   generate a histogram tone curve output by performing a weighted sum of the tone-mapped first output and an output of the performed histogram tone mapping,
   generate a final output tone curve based on the tone-mapped first output and the histogram tone curve output, and
   generate output image data based on the final output tone curve and the received image data.

9. The image processing apparatus of claim 8, wherein the at least one processor is further configured to:
   analyze and equalize a histogram of the image data;
   compare histogram bins of the equalized histogram with a first reference value;
   determine a first weight value based on results of the comparison; and
   adjust the histogram tone curve output using the first weight value.

10. The image processing apparatus of claim 9, wherein the at least one processor is further configured to:
    calculate a plurality of difference values between adjacent histogram bins among a plurality of the histogram bins included in the equalized histogram; and
    compare a greatest difference value of the plurality of difference values with the first reference value.

11. The image processing apparatus of claim 10, wherein the at least one processor is further configured to:
    adjust the first weight value to a greatest weight value of a first weight value range in response to the greatest difference value being less than or equal to the first reference value.

12. The image processing apparatus of claim 10, wherein the at least one processor is further configured to:
    adjust the first weight value to a value greater than a target weight value in response to the greatest difference value being greater than the first reference value and less than or equal to a second reference value; and
    adjust the first weight value to the target weight value in response to the greatest difference value being greater than the second reference value.

13. The image processing apparatus of claim 12, wherein the first reference value is obtained by subtracting a transient length from a desired threshold value, and the second reference value is set to the desired threshold value.

14. The image processing apparatus of claim 9, wherein the at least one processor is further configured to:
    adjusts the histogram tone curve based on the first weight value and the histogram of the image data.

15. The image processing apparatus of claim 9, wherein the at least one processor is further configured to:
generate the final output tone curve by applying a second weight value to the histogram tone curve, a global tone curve associated with the performed global tone mapping, and a local tone curve associated with the performed local tone mapping.

16. A non-transitory computer-readable medium including computer readable instructions, which when executed by at least one processor, causes the at least one processor to:
transform an input image data into a histogram;
equalize the histogram using a cumulative distribution function;
set a first weight value based on the equalized histogram and a first reference value;
generate a first tone curve of the histogram by using the first weight value;
generate a final output tone curve by applying a second weight value to the first tone curve and a second tone curve applied to the input image data; and
generate output image data based on the final output tone curve and the input image data.

17. The non-transitory computer-readable medium of claim 16, wherein the setting the first weight value further comprises:
calculating a plurality of difference values between adjacent histogram bins among a plurality of histogram bins included in the equalized histogram; and
comparing the greatest difference value among the plurality of difference values with the first reference value.

18. The non-transitory computer-readable medium of claim 17, wherein the setting the first weight value further comprises:
setting the first weight value to the greatest weight value of a first weight value range in response to the greatest difference value being less than or equal to the first reference value;
setting the first weight value to a value greater than a target weight value in response to the greatest difference value being greater than the first reference value and less than or equal to a second reference value; and
setting the first weight value to the target weight value in response to the greatest difference value being greater than the second reference value.

19. The non-transitory computer-readable medium of claim 18, wherein
the first reference value is obtained by subtracting a transient length from a desired threshold value, and
the second reference value is set to the desired threshold value.

20. The non-transitory computer-readable medium of claim 16, wherein the generating the first tone curve further includes:
generating a histogram tone curve from the input image data and the equalized histogram; and
generating the first tone curve through a weighted sum obtained by applying the first weight value to a linear line having a slope of 1 and the histogram tone curve.

* * * * *